United States Patent
Coz et al.

(10) Patent No.: US 9,804,393 B1
(45) Date of Patent: Oct. 31, 2017

(54) VIRTUAL REALITY HEADSET

(71) Applicant: GOOGLE INC., Mountain View, CA (US)

(72) Inventors: David Coz, Mountain View, CA (US); Damien Henry, Malakoff (FR); Christian Plagemann, Palo Alto, CA (US); Boris Smus, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 294 days.

(21) Appl. No.: 14/617,223

(22) Filed: Feb. 9, 2015

(51) Int. Cl.
 *G02B 27/01* (2006.01)
 *G06T 19/00* (2011.01)

(52) U.S. Cl.
 CPC .......... *G02B 27/017* (2013.01); *G06T 19/006* (2013.01)

(58) Field of Classification Search
 CPC ............................. G02B 27/017; G06T 19/006
 See application file for complete search history.

(56) References Cited

U.S. PATENT DOCUMENTS

| | | | |
|---|---|---|---|
| 5,344,065 A * | 9/1994 | Moran | B65D 5/42 229/103 |
| D374,002 S | 9/1996 | Bassett et al. | |
| 6,046,727 A | 4/2000 | Rosenberg | |
| 8,303,123 B2 | 11/2012 | Kory | |
| D687,434 S | 8/2013 | Serota | |
| D701,206 S | 3/2014 | Luckey et al. | |
| 8,686,959 B2 | 4/2014 | Payne | |
| D704,704 S | 5/2014 | Tatara et al. | |
| D719,953 S | 12/2014 | Nokuo et al. | |
| 8,908,015 B2 | 12/2014 | Capper | |

(Continued)

FOREIGN PATENT DOCUMENTS

| | | |
|---|---|---|
| CN | 204188882 U | 3/2015 |
| EP | 0708350 A1 | 4/1996 |

(Continued)

OTHER PUBLICATIONS

Dodocase, (https://web.archive.org/web/20150208221833/http://www.dodocase.com/products/google-cardboard-vr-goggle-toolkit), Feb. 8, 2015.*

(Continued)

*Primary Examiner* — Ariel Balaoing
(74) *Attorney, Agent, or Firm* — Brake Hughes Bellermann LLP

(57) ABSTRACT

In a general aspect, a virtual reality headset can include a goggle portion having a chassis including left, right, top and bottom sides. The chassis can be open at a first end and a second end. The first end can be configured for placement against or near a user's face. The second end can be configured to receive an electronic device including a display. The goggle portion can also include a lens frame assembly disposed within the chassis and disposed between the first end and the second end. The headset can also include an enclosure flap hingably coupled with the goggle portion at a first end of the enclosure. A second end of the enclosure flap can be removably attachable to the chassis to secure the electronic device in the VR headset. The goggle portion and the enclosure flap can be a unitary structure formed from a single precision-cut sheet.

20 Claims, 14 Drawing Sheets

(56) References Cited

U.S. PATENT DOCUMENTS

| | | | |
|---|---|---|---|
| 8,957,835 | B2 | 2/2015 | Hoellwarth |
| D727,318 | S | 4/2015 | Garcia |
| D732,028 | S | 6/2015 | Kim et al. |
| D738,374 | S | 9/2015 | Luckey et al. |
| D740,814 | S | 10/2015 | Bosveld et al. |
| 9,176,325 | B2 | 11/2015 | Lyons |
| D749,583 | S | 2/2016 | Trexler et al. |
| D751,072 | S | 3/2016 | Lyons et al. |
| D753,111 | S | 4/2016 | Zhu et al. |
| D755,789 | S | 5/2016 | Lyons et al. |
| D757,003 | S | 5/2016 | Goossens et al. |
| D765,658 | S | 9/2016 | Spio et al. |
| D766,896 | S | 9/2016 | Lou et al. |
| D792,398 | S | 7/2017 | Costa et al. |
| 2010/0079356 | A1 | 4/2010 | Hoellwarth |
| 2010/0277575 | A1 | 11/2010 | Ismael |
| 2013/0147721 | A1 | 6/2013 | McGeever |
| 2014/0176608 | A1* | 6/2014 | Boysen ............... A23G 3/28 345/633 |
| 2014/0247246 | A1 | 9/2014 | Maus |
| 2014/0267637 | A1 | 9/2014 | Hoberman |
| 2015/0138645 | A1 | 5/2015 | Kim |
| 2015/0215608 | A1 | 7/2015 | Tahara |
| 2015/0234189 | A1 | 8/2015 | Lyons et al. |
| 2015/0253574 | A1 | 9/2015 | Thurber |
| 2016/0062454 | A1 | 3/2016 | Choi et al. |
| 2016/0180591 | A1 | 6/2016 | Chang |
| 2016/0203642 | A1 | 7/2016 | Thomas |
| 2016/0349836 | A1 | 12/2016 | Goossens et al. |
| 2017/0031164 | A1 | 2/2017 | Costa et al. |
| 2017/0031165 | A1 | 2/2017 | Costa et al. |

FOREIGN PATENT DOCUMENTS

| | | | |
|---|---|---|---|
| EP | 2942305 | A1 | 11/2015 |
| ES | 1115455 | U | 7/2014 |
| GB | 2516242 | A | 1/2015 |
| WO | 2012035174 | A1 | 3/2012 |
| WO | 2014057557 | A1 | 4/2014 |
| WO | 2014103006 | A1 | 7/2014 |
| WO | 2014108693 | A1 | 7/2014 |

OTHER PUBLICATIONS

Knox Labs, Classic Cardboard VR kit Assembly (https://www.youtube.com/watch?v=zRu00cTX6hs), Dec. 19, 2014.*

International Search Report and Written Opinion for PCT Patent Application No. PCT/US2016/043492, mailed on Dec. 2, 2016, 13 pages.

Brewster, "Why Google Cardboard is actually a huge boost for virtual reality", retrieved on Jun. 24, 2016 from https://gigaom.com/2014/06/28/why-google-cardboard-is-actually-a-huge-boost-for-virtual-reality/, Jun. 28, 2014, 7 pages.

Dodocase, "DODOcase Virtual Reality Kit 1.2 Assembly Instruction Video YouTube", retrieved on Jun. 24, 2016 from https://www.youtube.com/watch?v=ze1528521Yw, Oct. 8, 2014, 3 pages.

Evans, "The Exciting Possibilities of DIY Virtual Reality", retrieved on Jun. 24, 2016 from http://blog.fictiv.com/posts/the-exciting-possibilities-of-diy-virtual-reality, Dec. 8, 2014, 11 pages.

Hoberman, et al., "Immersive Training Games for Smartphone-Based Head Mounted Displays", retrieved on Jun. 24, 2016 from http://projects.ict.usc.edu/mxr/wp-content/uploads/2011/12/SmartphoneVR.pdf, 2012, 2 pages.

Ladysith, "Copper tape touch extension for Cardboard VR kits", retrieved on Jun. 24, 2016 from https://web.archive.org/web/20150101222824/http://www.instructables.com/id/CoppertapetouchextensionforCardboardVRkits, Jan. 1, 2015, 5 pages.

International Search Report and Written Opinion for PCT Application No. PCT/US16/34756, mailed Sep. 2, 2016, 10 pages.

Touthackamon, "How to make DODOCase VR kit V 1.2 from your old V 1.1", retrieved on Jun. 24, 2016 from https://web.archive.org/web/20141101135535/http://www.instructables.com/id/How-to-make-DODOCase-VR-kit-V-12-from-your-old-V-1/, Nov. 1, 2014, 8 pages.

Notice of Allowance for U.S. Appl. No. 29/516,996, mailed Oct. 23, 2015, 12 pages.

Non-Final Office Action for U.S. Appl. No. 14/815,124, mailed on Jan. 18, 2017, 28 pages.

International Search Report and Written Opinion for PCT Application No. PCT/US2016/033212, mailed Sep. 23, 2016, 15 pages.

Invitation to Pay Add'l Fees and Partial Search Report for PCT Application No. PCT/US2016/033212, mailed Aug. 1, 2016, 7 Pages.

Invitation to Pay Add'l Fees and Partial Search Report for PCT Application No. PCT/US2016/43492, mailed Oct. 6, 2016, 7 Pages.

"Google Cardboard", promotional materials found at www.google.com/cardboard, printed May 12, 2015, 3 pages. First available approximately Jun. 27, 2014.

"Multipart Plan" dated Feb. 26, 2014, 1 page.

"Photo 1" posted to Instagram by inventor on Oct. 6, 2013, 1 page.
"Photo 2" posted to Instagram by inventor on Oct. 6, 2013, 1 page.
"Photo 3" posted to Instagram by inventor on Oct. 6, 2013, 1 page.

Notice of Allowance for U.S. Appl. No. 29/534,813, mailed on Mar. 21, 2017, 39 pages.

Written Opinion for PCT Application No. PCT/US16/34756, dated Jul. 3, 2017, 5 pages.

Response to Final Office Action for U.S. Appl. No. 14/815,124, filed Jul. 13, 2017, 8 pages.

* cited by examiner

VIRTUAL REALITY HEADSET

TECHNICAL FIELD

This disclosure relates to virtual reality headsets. More specifically, this disclosure relates to virtual reality headsets that can be used in conjunction with user electronic devices running virtual reality applications.

SUMMARY

In a general aspect, a virtual reality (VR) headset can include a goggle portion and an enclosure flap. The goggle portion can include a chassis having a left side, a right side, a top side and a bottom side. The chassis can be open at a first end and open at a second end. The first end can be configured for placement near or against a face of a user. The second end can be configured to receive an electronic device including a display panel. The goggle portion can also include a lens frame assembly that is disposed within the chassis and disposed between the first end and the second end. The enclosure flap can be hingably coupled with the goggle portion at a first end of the enclosure flap. A second end of the enclosure flap can be removably attachable to the chassis to secure the electronic device in the VR headset. The goggle portion and the enclosure flap can be a unitary structure formed from a single precision-cut sheet.

Implementations can include one or more of the following features. For instance, the headset can include a fastening device disposed on at least one of the enclosure flap and the top surface of the chassis. The fastening device can be configured to removably attach the second end of the enclosure flap to the chassis.

The headset can include a pair of aspherical lenses disposed in the lens frame assembly, such that images displayed on a display panel of the electronic device are viewable from the first end of the chassis through the pair of aspherical lenses. The lens frame can include a three-layer stack having a first outer layer, an inner layer and a second outer layer. An aspherical lens of the pair of aspherical lenses can be disposed within a lens opening defined in the inner layer. The aspherical lens of the pair of aspherical lenses can be held in place by respective pluralities of retention tabs disposed around respective perimeters of respective lens openings defined in the first outer layer and the second outer layer.

The headset can include an input mechanism disposed on the chassis. The input mechanism can be configured to interact with the electronic device. The input device can include a magnetic input device. The input device can be disposed on one of the left side of the chassis and the right side of the chassis. The input device can include a first magnet disposed on an interior surface of the right side of the chassis and a second magnet disposed within a slot defined in an exterior surface of the right side of the chassis. The second magnet can be slidable, in response to an external force, from a first position within the slot to a second position within the slot. The magnetic forces of the first magnet and the second magnet can cause the second magnet to return from the second position to the first position upon removal of the external force.

The single precision-cut sheet can be folded to form the VR headset. The single precision-cut sheet can be one of a die-cut cardboard sheet and a laser-cut cardboard sheet.

The headset can include a near field communication (NFC) tag disposed on the enclosure flap. The NFC communication tag can be configured to identify the VR headset to the electronic device.

The goggle portion can include a center flap disposed between the lens frame assembly and the second end. The center flap can be configured, in conjunction with the enclosure flap, to secure the electronic device in the VR headset. The headset can include a plurality of complementary tabs and slots formed in the single precision-cut sheet. The plurality of complementary tabs and slots can be configured to align the center flap with the chassis the lens frame assembly.

The headset can include a plurality of complementary tabs and slots formed in the single precision-cut sheet, the plurality of complementary tabs and slots can be configured to align the lens frame assembly in the chassis. The plurality of complementary tabs and slots can be configured to align a first layer of the right side of the chassis with at least a second layer of the right side of the chassis.

The headset can include assembly instructions for the VR headset printed on the single precision-cut sheet. The headset can include a visual token printed on the single precision-cut sheet. The visual token can be configured to interact with VR content executed by the electronic device in response to recognition of the visual token using a camera of the electronic device. The headset can include a non-skid insert disposed on at least an interior surface of the bottom side of the chassis adjacent the first end of the enclosure flap. The non-skid insert can be configured to prevent movement of the electronic device in the VR headset.

In another general aspect, an article of manufacture can include a single die-cut cardboard sheet configured to be folded to form a virtual reality (VR) headset. The single die-cut cardboard sheet can include a lens frame portion having a first lens frame layer, a second lens frame layer and a third lens frame layer configured to be folded to form a three-layer stack configured to secure a pair of aspherical lenses of the VR headset. The single die-cut cardboard sheet can also include chassis having a plurality of sections that are configured to be folded to form the chassis such that the chassis is disposed around the lens frame portion. The chassis can be further configured to secure the lens frame portion in a fixed position within the chassis. The single die-cut cardboard sheet can further include an enclosure flap that is hingably coupled with a first section of the plurality of sections of the chassis. The enclosure flap can be configured to be removably attached with a second section of the plurality of sections of the chassis to secure an electronic device in the VR headset.

Implementations can include one or more of the following features. For instance, the article of manufacture can include at least a first adhesive strip for fixing the first lens frame, the second lens frame layer and the third lens frame layer in their folded positions. The article of manufacture can include at least a second adhesive strip for fixing the plurality of sections of the chassis in their folded positions.

The details of one or more implementations are set forth in the accompanying drawings and the description below. Other features will be apparent from the description and drawings, and from the claims.

Like reference symbols in the various drawings indicate like elements. Reference numbers for some like elements may not be repeated for all such elements. Some reference numbers for certain elements of a given implementation may not be repeated in each drawing corresponding with that implementation. Some reference numbers for certain elements of a given implementation may be repeated in other drawings corresponding with that implementation, but may not be specially discussed with reference to each corresponding drawing.

DETAILED DESCRIPTION

This disclosure is directed to virtual reality (VR) headsets (which can also be referred to as VR goggles) that can be provided to users at a relatively low cost, as compared with other VR headset implementations. The VR headsets described herein can be used in conjunction with an electronic device that includes a display panel, such as a smartphone, a tablet, etc. VR applications or content can be executed on the electronic device, which can be inserted and secured in the VR headset, such as described herein. A user can then view images associated with (produced by) such VR applications or content that are displayed on the display panel of the electronic device using the VR headset to experience the content as virtual reality content (e.g., in a virtual 3-dimensional view).

The VR headset implementations shown in the figures and described herein are given by way of example. Accordingly, features of one implementation can be included in other implementations, where appropriate. Further, features of a given implementation can be omitted in other implementations. Also, the elements of the implementations shown in the figures and described herein are illustrative and may not be shown to scale. Further, the arrangement of the particular elements of a given apparatus can depend on the specific implementation.

In the following description, the various elements of the illustrated VR headset implementations may referenced using relative terms, such as top, left, right, bottom, etc. These terms are used by way of illustration to describe the illustrated implementations. In other implementations, or other orientations, these references may change. For instance, a left side of a VR headset in one view may be referred to as a right side in another view of that VR headset.

Additionally, elements of the VR headset implementations described herein may be referred to using enumerated references, e.g., first, second, etc. As noted above with respect to relative references, such enumerated references could change depending on the particular orientation (in a given drawing) or the particular implementation of a VR headset. For instance a first end in one view could be referred to as a second end in another view or when discussing a different VR headset implementation.

Figure 1A:
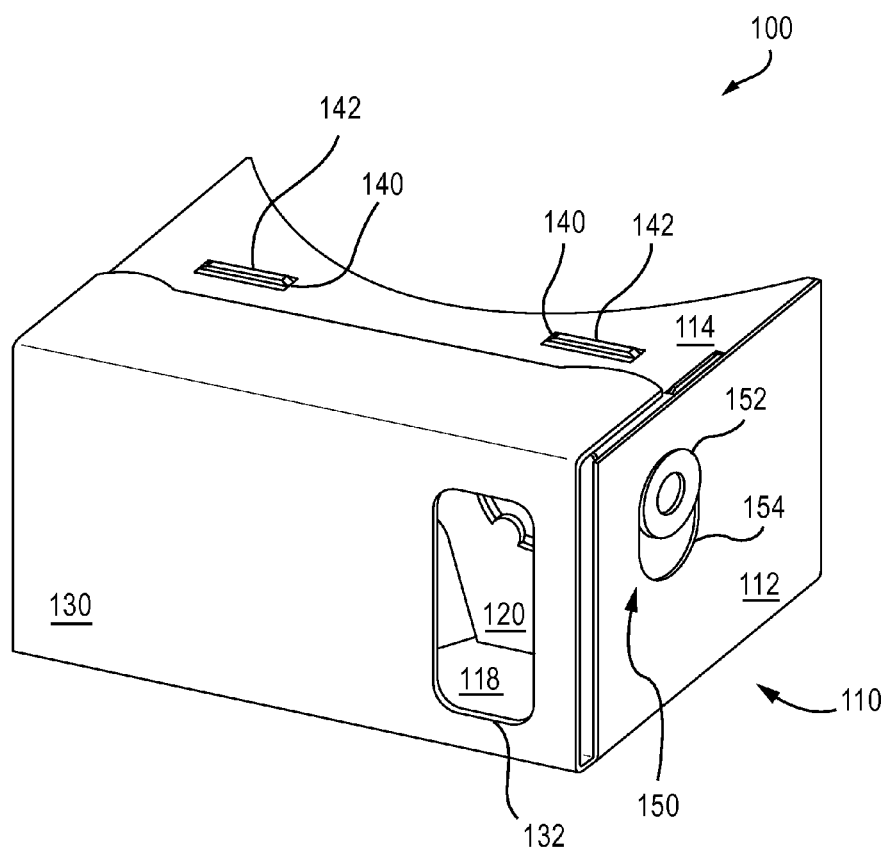
FIG. 1A is a drawing illustrating a virtual reality (VR) headset from a first perspective, according to an implementation.

FIG. 1A is a drawing illustrating a virtual reality (VR) headset 100 from a first perspective, according to an implementation. As described herein, the VR headset 100 can be produced using a single die-cut sheet of suitable material, such as a cardboard sheet. In other implementations, other cutting (e.g., precision cutting) techniques may be used in place of die cutting, such as laser cutting, for example. In the implementation of FIG. 1A, a die-cut cardboard sheet can be folded (e.g., using folding instructions that are printed directly on the die-cut cardboard sheet) to form the VR headset 100, which can include a goggle portion including a chassis 110 and a lens frame assembly (lens frame portion) 120. The VR headset can also include an enclosure flap 130, as illustrated in FIG. 1A.

As shown in FIG. 1A, the chassis 110 of the VR headset can include a right side 112, a top side 114, a left side 116 (not shown in this view) and a bottom side 118. For purpose of clarity, and to avoid confusion with respect to the relative arrangement of the sides of the chassis 110 in the various views discussed herein, the right side 112, the top side 114, the left side 116 and the bottom side 118, in the remainder of this description, will be referred to, respectively, as the side 112, the side 114, the side 116 and the side 118.

The lens frame assembly 120 may be aligned and/or secured within the chassis 110 using a plurality of slots 140 and a plurality of complimentary tabs 142, such as shown on the side 114 in FIG. 1A. Other such complementary slots and tabs are illustrated in the various implementations described herein, though they may not be specifically referenced. These complementary slots and tabs can be configured to align and/or secure other elements (portions, sections, etc.) of the VR headset 100 in their desired positions.

As shown in FIG. 1A, the enclosure flap 130 can be hingably coupled (e.g., at a first end of the enclosure flap 130) with the side 118 of the chassis 110. As the VR headset 100 can be formed from a single die-cut (precision-cut) cardboard sheet, a hinge between the enclosure flap 130 and the side 118 may be defined by a portion of the cardboard sheet (e.g., as part of an associated cutting process). As also shown in FIG. 1A, a second end of the enclosure flap 130 can be attached (e.g., removably attached using an attachment mechanism, fastening device, etc.) to the side 114 of the chassis 110. In this arrangement, the enclosure flap 130 may secure an electronic device (not shown) in the VR headset 100 with a display panel of the electronic device facing the lens frame assembly 120, so that images displayed on the electronic device (e.g., images associated with a VR application or VR content) are viewable through a pair of lenses (e.g., aspherical lenses) that are disposed (affixed, mounted, etc.) in the lens frame assembly 120. As shown in FIG. 1A, the enclosure flap 130 can also include a window 132 that allows a camera of an electronic device that is disposed within the VR headset 100 to capture images without removing the electronic device from the VR headset 100.

As also shown in FIG. 1A, the VR headset 100 can include an input device (input mechanism) 150 that is located on the side 112 of the chassis 110. In other implementations, the input device 150 could be located on a different side of the chassis 110. In the VR headset 100 shown in FIG. 1A, the input device 150 includes a first magnet 152 that is disposed within a slot 154 on the side 112 of the chassis 110. The input device 150 can also include a second magnet 158 (not shown in FIG. 1A) that is disposed (fixedly disposed) on an opposing surface of the side 112 from the magnet 152. In this implementation, the magnet 152 can be slid (e.g., by an external force, such as user's finger) within the slot 154 (e.g., to the opposite end of the slot 154), causing the magnetic field produced by the two magnets of the input device 150 to change. An electronic device that is inserted in the VR headset 100 may detect this change in the magnetic field as an input signal that allows a user to interact with a VR application or VR content that is being executed on the electronic device. When the external force is removed, the magnetic forces of the magnets 152 and 158 may cause the magnet 152 to return to its original position with the slot 154 (e.g., as shown in FIG. 1A).

Figure 1B:
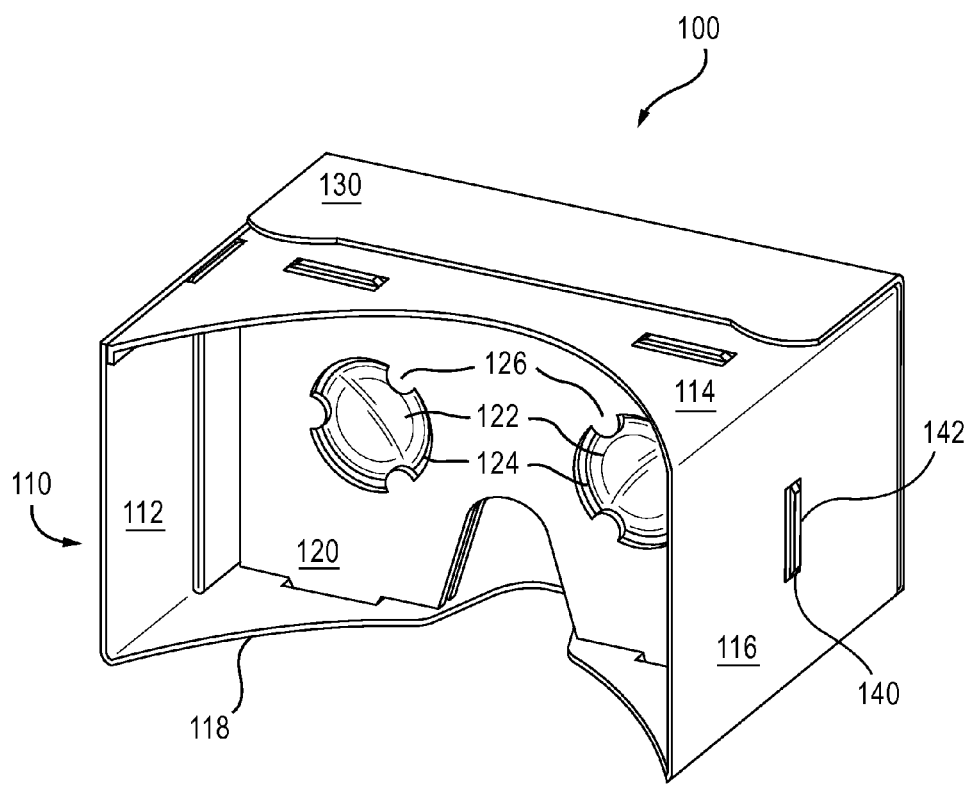
FIG. 1B is a drawing illustrating the VR headset of FIG. 1A from a second perspective, according to an implementation.

FIG. 1B is a drawing illustrating the VR headset 100 of FIG. 1A from a second perspective. In the perspective view of FIG. 1B, the VR headset 100 is shown from an end that a user can place to, or near his or her face in order to view VR content displayed on an electronic device that is inserted in the VR headset 100. For instance, as shown in FIG. 1B, the sides 114 and 118 each have a curved portion that allows a user to comfortably place the VR headset 100 over his or her eyes when using the VR headset 100. The sides 112 and 116 are configured to block out external light when the headset is placed to, or near a user's face, so as to improve the user's VR viewing experience.

The side 116 of the chassis 110 (not visible in FIG. 1A) is shown in FIG. 1B and includes a slot 140 and a complementary tab 142 that can be configured (e.g., in cooperation with other complementary slots 140 and tabs 142) to align and/or affix the lens frame assembly 120 with the chassis 110.

As shown in FIG. 1B, the lens frame assembly 120 can include a pair of lenses (e.g., a pair of aspherical lenses) 122 that are disposed (affixed, mounted, etc.) in openings 124 in the lens frame assembly. A focal length of the lenses 122 can be selected based on the physical dimensions of the VR headset. As described in further detail below, the lens frame assembly may include a three-layer stack (e.g., three layers of die-cut cardboard), a first outer layer, an inner layer and a second outer layer, each with a lens opening 124 for each of the lenses 122. The inner layer may have circular lens openings in which the lenses 122 are disposed. The two outer layers may each include a plurality of tabs 126 that are disposed around their lens openings 124 to hold the lenses 122 in place in the lens frame assembly 120 (e.g., with the lens openings 124 to the inner layer). In other approaches, the lenses 122 may be mounted (affixed, etc.) in the lens frame assembly 120 using other approaches. The tabs 126 shown in FIG. 1B can be sized such that they do not significantly occlude the lenses 122, or significantly reduce the field of view of the lenses 122 when viewing VR content that is presented on an electronic device inserted in the VR headset 100.

Figure 2:
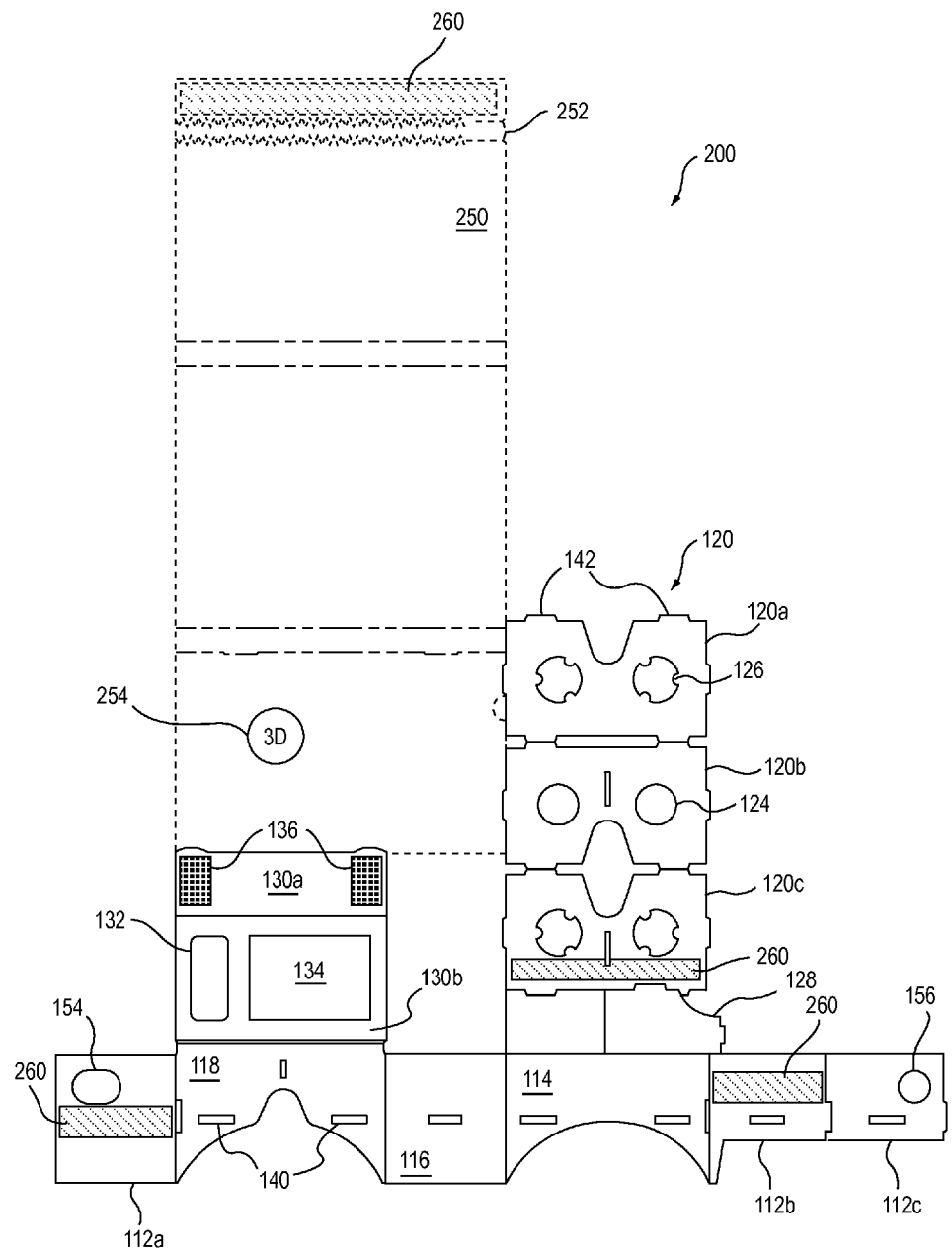
FIG. 2 is a diagram illustrating a layout drawing of a die-cut cardboard sheet that can be used to form the VR headset of FIGS. 1A and 1B, according to an implementation.

FIG. 2 is a diagram illustrating a plan drawing of a die-cut cardboard sheet 200 that can be used to form the VR headset 100 of FIGS. 1A and 1B, according to an implementation. In other implementations, the sheet 200 can be produced using cutting techniques (precision cutting techniques) other than die-cutting. For example, laser cutting could be used to form the sheet 200. Alternatively, a combination of different cutting techniques can be used to form the sheet 200 shown in FIG. 1. The term precision-cutting technique, as used herein, can be used to describe (or refer to) cutting techniques that allow for achieving desired dimension tolerances for the sheet 200 of FIG. 2. If such tolerances are not met, the sheet 200 may not properly form a corresponding VR headset, such as the VR headset 100 of the FIGS. 1A and 1B. For purposes of illustration, the sheet 200 can be used to form the VR headset 100 and will be described as such herein.

Referring to FIGS. 1A, 1B and 2, the chassis 110 of the VR headset 100 can include (be formed from) a plurality of sections of the sheet 200, which, in this implementation are arranged along the bottom of the sheet 200. The various sections of the sheet 200 can be defined (e.g., as part of the cutting process) by, in one approach, deforming the sheet 200 to form "hinges" between the sections. For instance, in order to form such a hinge, a die can be used to compress (deform) the sheet 200 so the sheet 200 is easily bendable (hinged) along such deformations. The particular arrangement and number of sections included in a sheet used to form a VR headset will depend on the particular implementation. The arrangement of the sheet 200 shown in FIG. 2 is given by way of example and for purposes of illustration.

Figure 4:
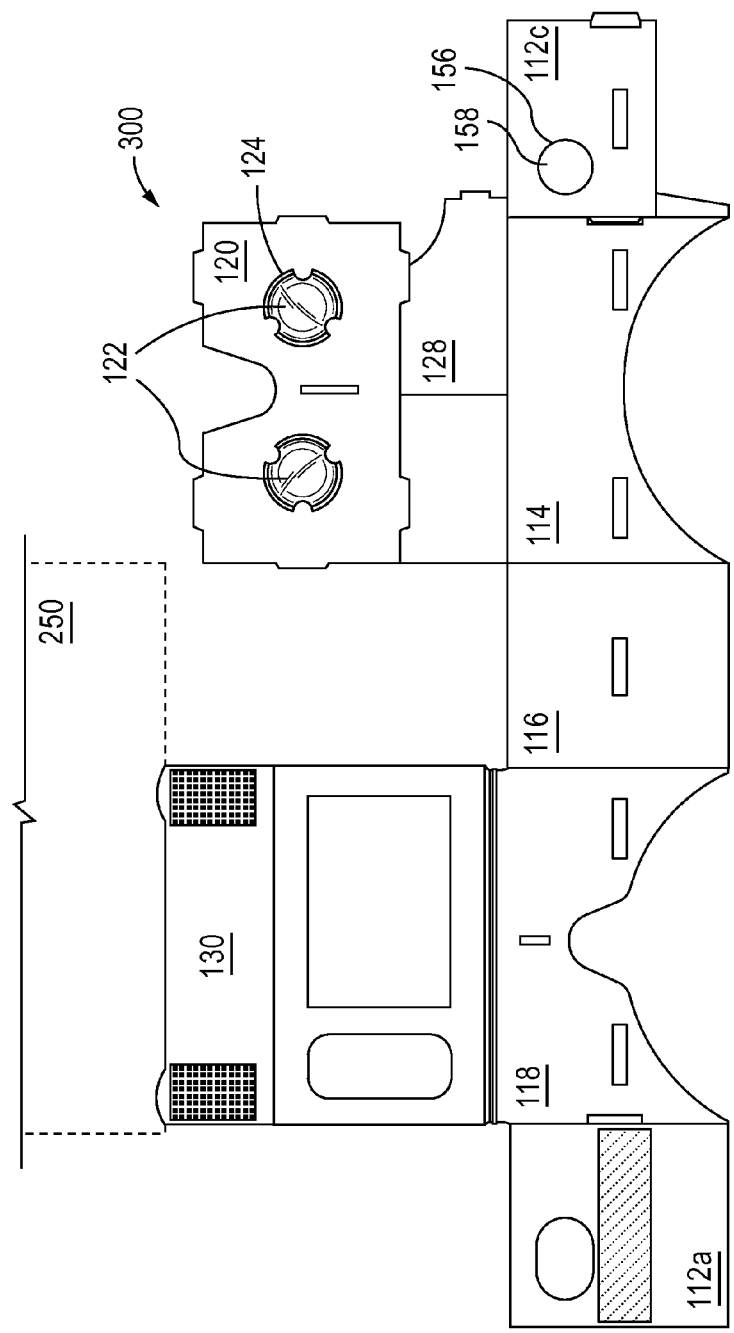
FIG. 4 is a diagram illustrating the package VR headset of FIG. 3 after removal of a tear strip and unfolding, according to an implementation.

As shown in FIG. 2, the sides 114, 116 and 118 of the VR headset 100 can each include a single, respective, section of the sheet 200. In the implementation of FIG. 2, the side 112 of the VR headset 100 can include three separate sections, section 112a, section 112b and section 112c. The sections 112a, 112b and 112c, after folding the sheet 200 to form the VR headset 100, can be affixed to one another to form the side 112, which would be a three-layer stack in this implementation. For instance, the section 112c can be folded (to the left in FIG. 2) so it is disposed on top of the section 112b. An adhesive strip 260 can be used to affix the section 112c to the section 112b. As shown in FIG. 2, the section 112c includes an opening 156 for the locating the second magnet 158 (not shown) of the input device 150 of the VR headset 100. The magnet 158, which is shown in FIG. 4, can be affixed within the opening 156 and held in place by a portion of the adhesive strip 260 (of the section 112b) that is exposed through the opening 156, e.g., when the section 112c is folded onto and affixed to the section 112b. The arrangement of the adhesive strips 260 in FIG. 2 is shown by way of example and other a number of other arrangements and/or approaches for affixing the sections of the sheet 200 to each other to produce the VR headset 100 are possible.

As shown in FIG. 2, the section 112a of the sheet 200 can include the slot 154 for the input device 150 of the VR headset 100. The section 112a, when folding the sheet 200 to form the VR headset 100, can be affixed (using the adhesive 260 on the section 112a) to the side of the section 112b that is opposite from the side of the section 112b that the section 112c is affixed to, which can secure the sides 112, 114, 116 and 118 of the chassis 110 in their desired arrangement.

In the implementation shown in FIG. 2, the lens frame assembly 120 of the VR headset 100 can include three sections 120a, 120b and 120c. For instance, the section 120b (along with the section 120a) can be folded (downward in FIG. 2) so that the section 120*b* (e.g., the inner layer of the lens frame assembly 120) is disposed on the section 120*c*. The section 120*b* can be affixed to the section 120*c* using the adhesive strip 260 that is shown on the section 120*c* in FIG. 2. The lenses 122 of the VR headset 100 can then be placed in the lens openings 124 of the section 120*b*. After placing the lenses 122 in the lens openings 124 of the section 120*b*, the section 120*a* can then be folded (upward in FIG. 2) so that it is disposed on the section 120*b* and affixed to the section 120*b* with an adhesive strip 260 (not shown). The tabs 126 of the sections 120*a* and 120*c* (e.g., first and second outer sections of the lens frame assembly 120), as discussed above, can retain the lenses 122 in the lens openings 124 of the section 120*b*.

The sheet 200 also includes a center flap 128 that, in the VR headset 100, as is illustrated in further detail below, is disposed between the lens frame assembly 120 and an end of the VR headset 100 at which the enclosure flap 130 is disposed (hingably coupled with). The center flap 128 can be configured to help secure an electronic device in the VR headset 100 (e.g., after attaching the enclosure flap to the side 114, such as the enclosure flap 130 is shown in FIGS. 1A and 1B). The center flap 128 can also provide a barrier between separate images (e.g., left and right stereoscopic images) displayed on a display panel of an electronic device that is inserted in the VR headset 100, which can improve a user's visual VR experience.

Figure 8:
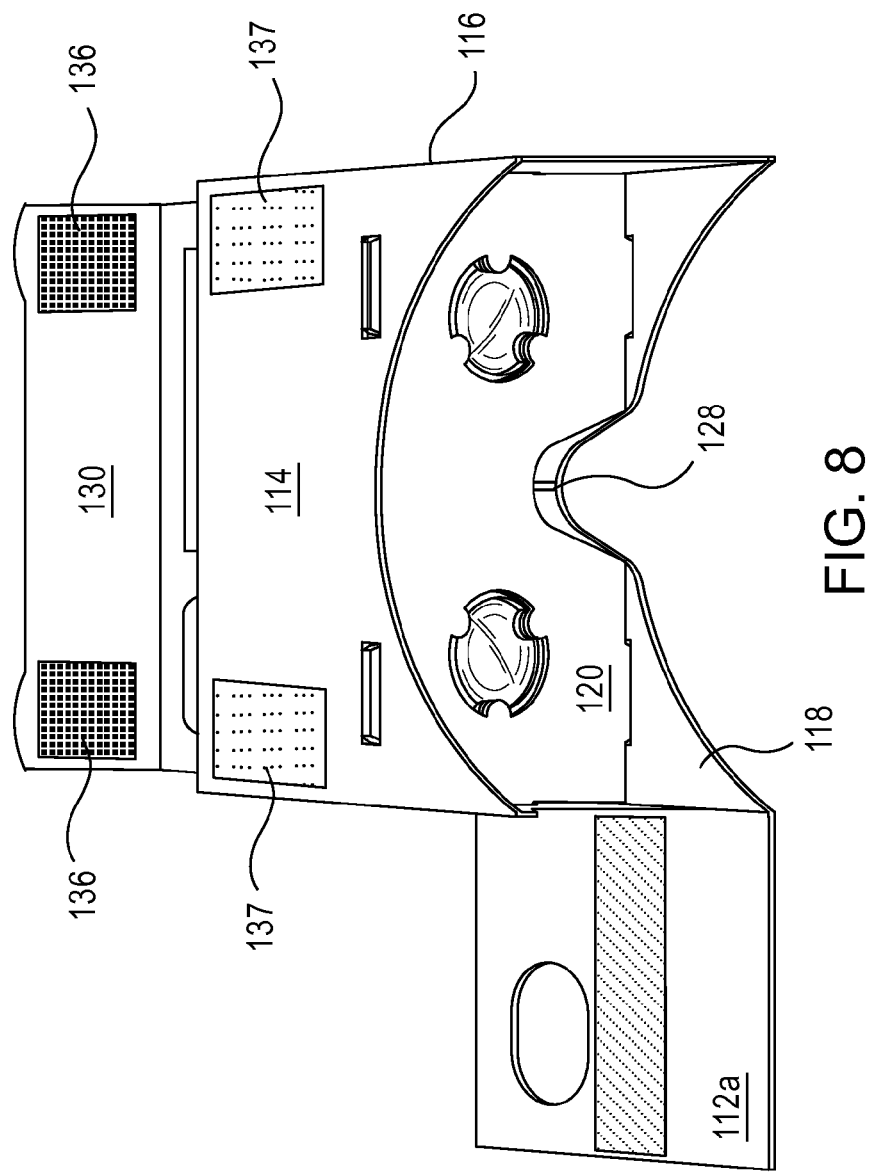

As shown in FIG. 2, the enclosure flap 130 may include two sections of the sheet 200, sections 130*a* and 130*b*. As illustrated in FIG. 2, the section 130*a* may include one or more attachment mechanisms (or devices) 136 for removably attaching the section 130*a* of the enclosure flap 130 with the side 114 of the VR headset 100. The specific attachment mechanism 136 used may depend on the particular implementation. For example, the attachment mechanism 136 may include one portion of a hook and loop fastener, where a complementary portion of the hook and loop fastener may be disposed on the side 114 of the VR headset 100. Such an arrangement is illustrated in FIG. 8 (as well as in FIGS. 9-11). In other implementations, the attachment mechanism 136 may take a number of other forms, such as an elastic fastener, an adhesive fastener, and so forth.

As illustrated in FIG. 2, the section 130*b* of the enclosure flap 130 can have a near-field communications (NFC) tag (sticker) 134 disposed thereon. The NFC tag can be used to identify the VR headset 100 to an electronic device that is inserted in the VR headset 100. Identification of the VR headset 100 by the electronic device using the NFC tag may allow the electronic device to determine a number of characteristics about the headset, such as a focal length of the lenses 122, physical dimensions of the VR headset 100, etc. The electronic device may using such characteristics of the VR headset 100 to modify how it renders visual VR content to improve the overall user experience.

As shown in FIG. 2, the sheet 200 can also include a section 250 that does not is not used to produce the VR headset 100. The section 250 is shown in broken lines in FIG. 2. In an implementation, the sections of the sheet 200 that are used to form the VR headset 100 (e.g., after completing the lens frame assembly 120 and affixing the second magnet 158 of the input device 150 on the adhesive strip 260 of the section 112*b* and with the opening 156 in the section 112*c*) can be folded and enclosed within the section 250 of the sheet 200. The adhesive strip 260 on the section 250 can be used to fixedly enclose the sections of the sheet 200 that are used to produce the VR headset 100 within (e.g., inside) the section 250, such as in the arrangement shown in FIG. 3, which may be suitable for shipment of the VR headset 100 to a user (e.g., a consumer).

As shown in FIG. 2, the section 250 can include a tear strip 252 that, when removed, can allow the sheet 200 to be readily unfolded. The section 250 can then be detached from the section 130*a* of the enclosure flap 130, prior to folding the sections of the sheet 200 that are included in the VR headset 100. In an example implementation, the sheet 200 may be perforated (during a cutting process used to form the sheet 200) along the line between the section 250 the section 130*a* shown in FIG. 2. Such a perforation may facilitate easy removal of the section 250 from section 130*a* of the enclosure flap 130 of the VR headset 100. In other implementations, the sheet 200 may be cut (e.g., with scissors or other cutting tool) to separate the section 250 from the enclosure flap 130. The configuration of the section 250 shown in FIG. 2 is given by way of example. In other implementations, the section 250 may have a different configuration or may be eliminated.

As also shown in FIG. 2, the section 250 includes a 3D token 254, which may be perforated, so that is easily removable from the section 250. The 3D token 254 can be used in conjunction with an augmented reality application (e.g., a VR application or VR content). For instance, a user can hold and/or manipulate the 3D token 254 in front of a camera included in a device running such an augmented reality application, and the augmented reality application can provide the user with a visual experience of manipulating a 3D object in VR.

Figure 3:
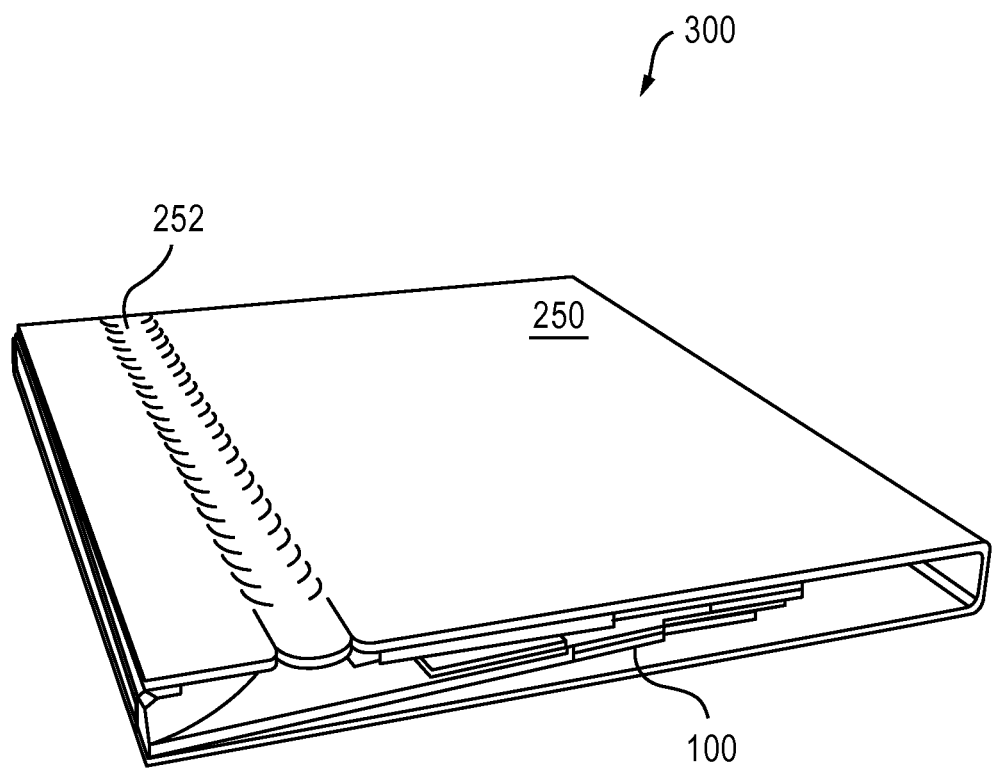
FIG. 3 is a diagram illustrating a packaged VR headset, according to an implementation.

As indicated above, FIG. 3 is a diagram illustrating a packaged VR headset 300, according to an implementation. The packaged VR headset 300 may be formed by folding the die-cut cardboard sheet 200 of FIG. 2 such that the VR headset 100 (e.g., the sections of the sheet 200 that are included in the VR headset 100) is disposed within the section 250 of the sheet 200. In an implementation, the sheet 200 may be folder to produce the packaged VR headset 300 after completing the lens frame assembly 120 and affixing the second magnet 158 of the input device 150 on the adhesive strip 260 of the section 112*b* and with the opening 156 in the section 112*c*, as was described above.

In such an approach, the section 250 of the sheet 200 may be folded around the sections of the VR headset 100 (which can also be folded inward so as to be aligned (vertically in FIG. 2) with the section 250). Once the sheet 200 is folded into the configured shown in FIG. 3, the section 250 can be secured around the VR headset 100 using the adhesive strip 260 that is disposed on the section 250 in FIG. 2 (not shown in FIG. 3). When the packaged VR headset 300 is received by a user, the user can remove the tear strip 252, allowing the packaged VR headset 300 to be easily unfolded, such as into the arrangement shown in FIG. 4.

FIG. 4 is a diagram illustrating the packaged VR headset 300 of FIG. 3 after removal of the tear strip 252 and unfolding the packaged VR headset 300, according to an implementation. As shown in FIG. 4, the three-layer lens frame assembly 120 is completed and the lenses 122 are disposed (affixed, mounted, etc.) in the lens openings 124 in the lens frame assembly 120. As is also shown in FIG. 4, the section 112*c* is folded onto and affixed with the section 112*b* (not visible in this view) and the second magnet 158 of the input mechanism 150 is affixed (using the adhesive strip 260) within the opening 156 of the section 112*c*. While not shown in FIG. 4, the first magnet 152 of the input mechanism 150 can be magnetically coupled (e.g., on a surface of the section 112*b*) with the second magnet 158 in the packaged VR headset 300.

After unfolding the packaged VR headset 300 into the arrangement shown in FIG. 4, the section 250 of the sheet 200 of FIG. 2 can be removed (e.g., along a perforation or using a cutting tool) and recycled or discarded. If included, the 3D visual token 254 can be removed from section 250 prior to it being recycled or discarded. After removal of the section 250, the packaged VR headset 300 can be folded to produce the VR headset 100, such as described herein.

FIGS. 5-9 are diagrams illustrating a process of folding the packaged VR headset 300 after removal of the section 250 to produce the VR headset 100. For clarity, the VR headset in FIGS. 5-9 is referenced with the reference number 100 throughout the illustrated folding process.

Figure 5:
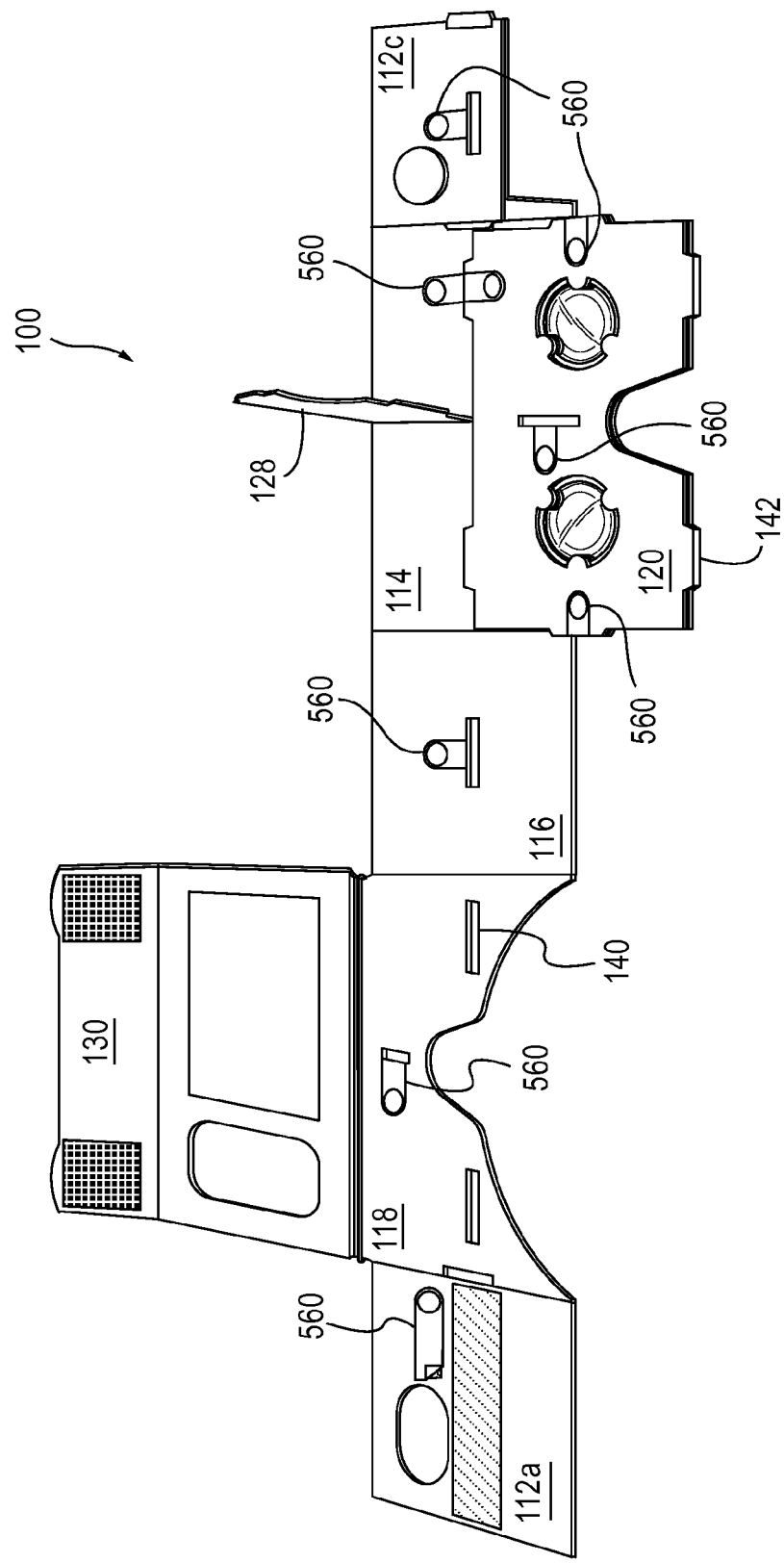
FIGS. 5, 6, 7, 8 and 9 are diagrams illustrating a process of folding the die-cut cardboard sheet of FIG. 4 to form the VR headset of FIGS. 1A and 1B, according to an implementation.

As shown in FIG. 5, the VR headset 100 may have folding, assembly and/or use instructions 560 that are printed directly on the precision-cut sheet 200 that is used to produce the VR headset 100. Such instructions 560 can include folding instructions, numbering or lettering for matching corresponding slots 140 and tabs 142 (e.g., tab A corresponds with slot A), instructions for using the VR headset 100, warnings (such as a warning regarding possible pacemaker interference from the magnets 152 and 158), as well as other information associated with the VR headset 100. As an example, such other information could include a computer readable code (e.g., a QR code) that a user can scan with an electronic device, where such scanning can cause the electronic device to navigate to a URL where the user can download VR applications and/or content to the electronic device. For purposes of clarity, the example instructions 560 are shown only in FIG. 5 but can be included in the various other views shown in the drawings.

As part of the folding process to produce the VR headset 100, the slots 140 and their corresponding tabs 142 should be properly aligned, with the tabs 142 being inserted into their corresponding slots 140. Such alignment of the slots 140 and tabs 142 when folding the package VR headset 300 to produce the VR headset 100 is not discussed with respect to each folding step.

Figure 6:
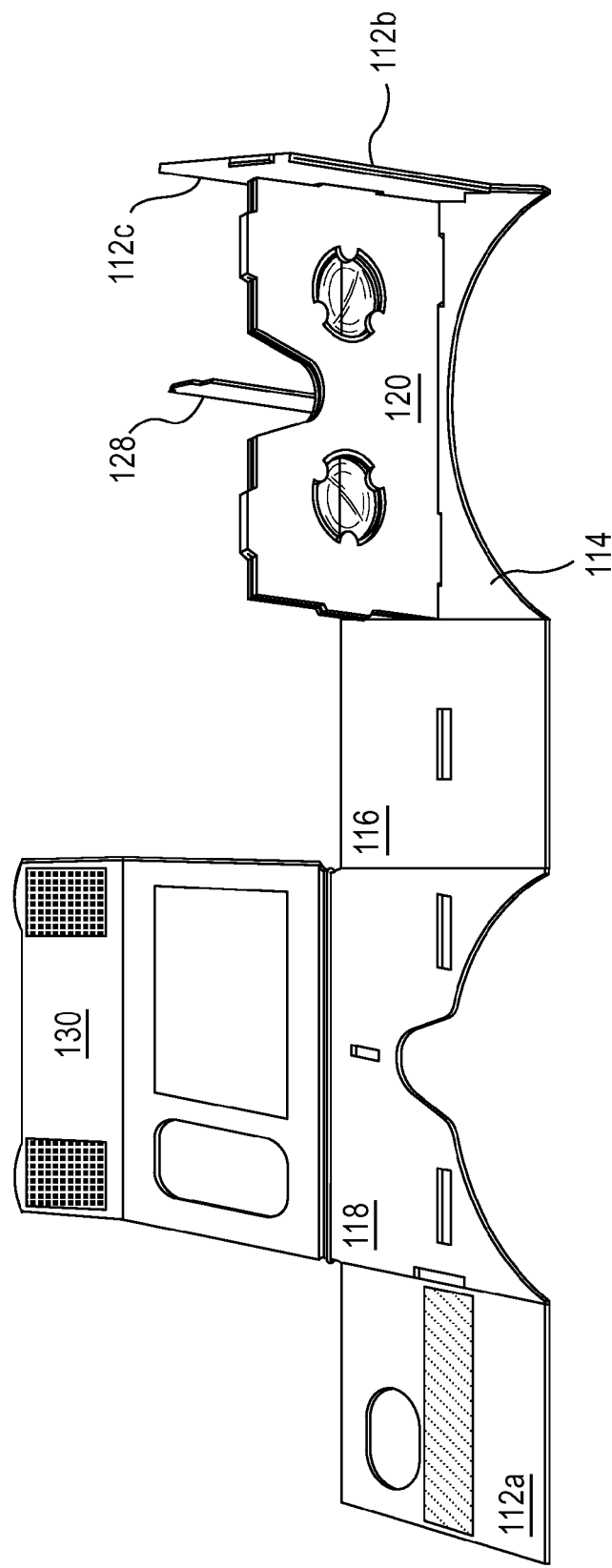

As shown in FIG. 5, as compared with FIG. 4, a first folding step for producing the VR headset 100 can be to fold the lens frame assembly 120 and the center tab 128 (downward), so that they are disposed, at least in part, on top of the side 114, as illustrated in FIG. 5. In a next folding step, shown in FIG. 5, the center tab 128 can be folded (lifted) so that it is perpendicular (substantially perpendicular) with the side 114. Referring now to FIG. 6, a next folding step can include folding (lifting) the lens frame assembly 120 up to align it with the center tab 128. Still with reference to FIG. 6, a next folding step can include folding (lifting) the stack of the sections 112b and 112c and aligning that stack with the lens frame assembly 120.

Figure 7:
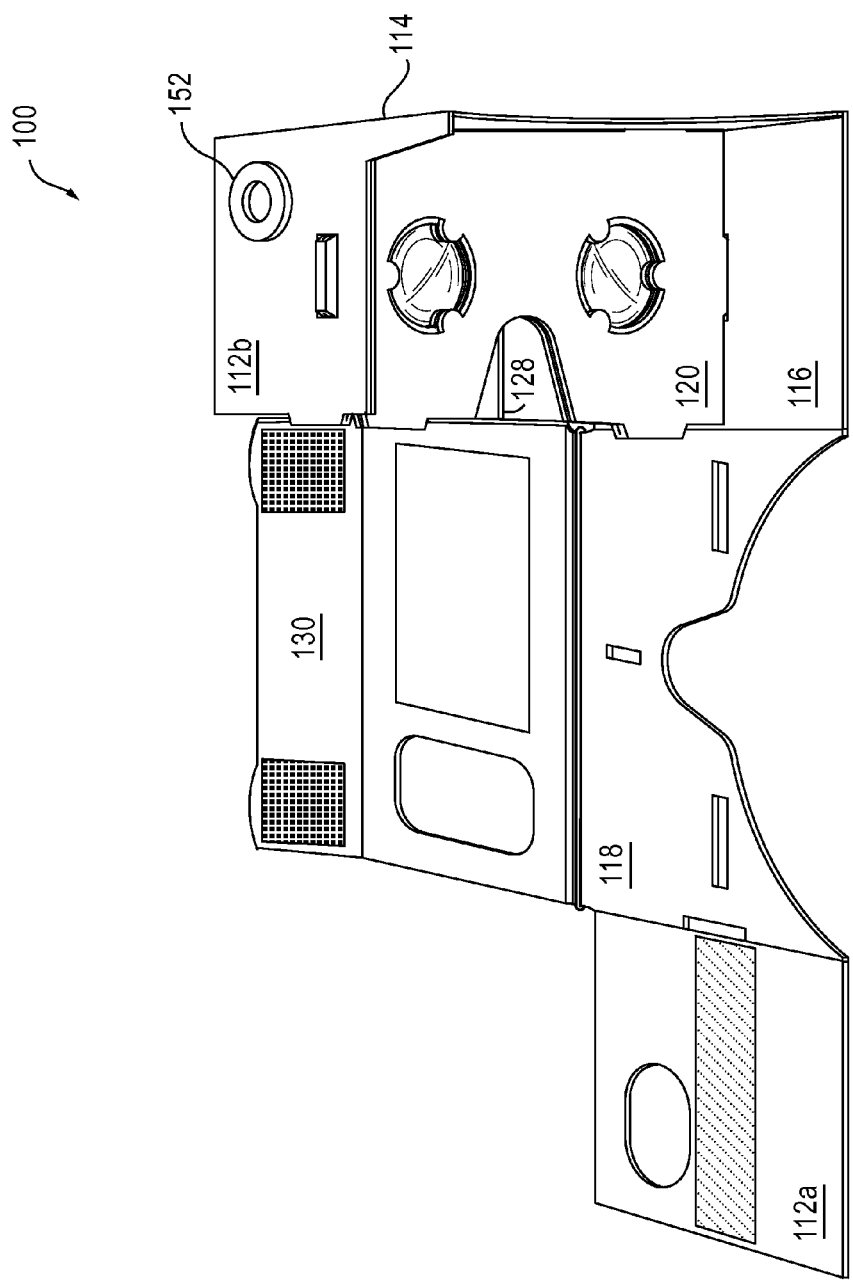

Referring now to FIG. 7, a next folding step can include folding (leftward in FIG. 7) the arrangement of the lens frame assembly 120, the center tab 128 and the stack of the sections 112b and 112c onto the side 116 and aligning the lens frame assembly 120 with the side 116. Referring now to FIG. 8, a next folding step can include folding (leftward in FIG. 8) the arrangement of the lens frame assembly 120, the center tab 128, the stack of the sections 112b and 112c and the side 116 onto the side 114 and aligning the lens frame assembly 120 with the side 114.

As shown in FIG. 8, at least one complementary portion 137 of a hook and loop fastener may be disposed on the surface of the side 114. In such an implementation, the complementary hook and loop fastener portions 136 and 137 can be used to removably attached an end of the enclosure flap 130 (e.g., the section 130a from FIG. 2) to the side 114 (e.g., of the chassis 110), such as to secure an electronic device in the VR headset 100.

Figure 9:
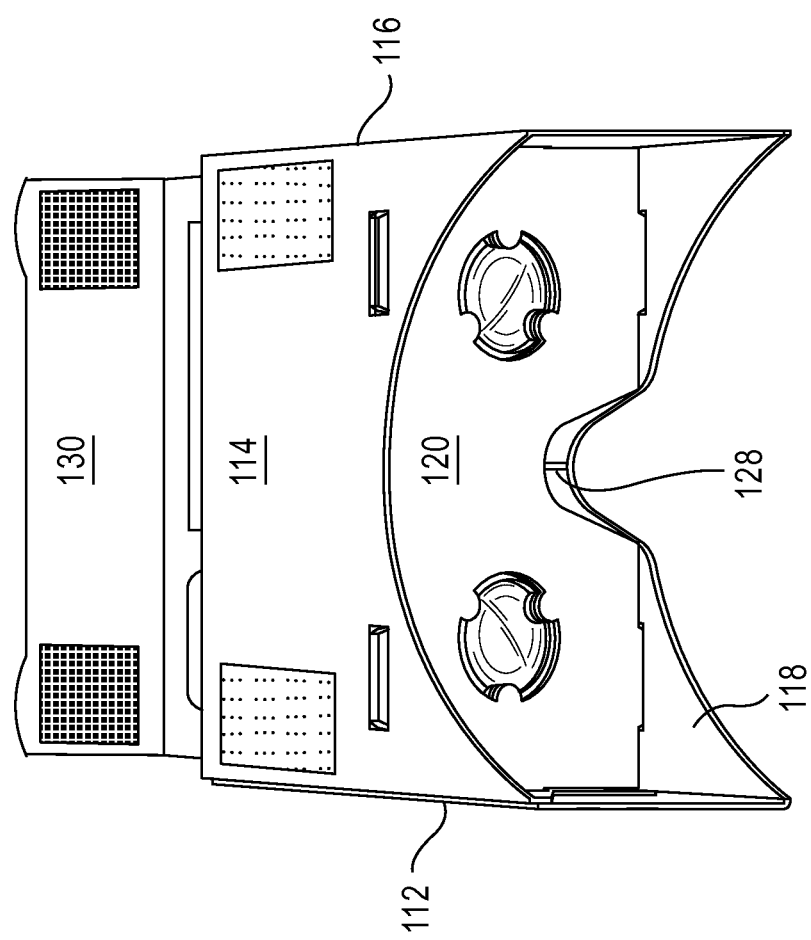

Referring to FIG. 9 as compared to FIG. 8, a next folding step can include folding (lifting) the section 112a (rightward in FIGS. 8 and 9) aligning the slot 154 of the input mechanism 150 with the first magnet 152 of the input mechanism and affixing the section 112c to the section 112b with the corresponding adhesive strip 260. After completing the folding step described with respect to FIG. 9, the VR headset 100 is ready for use in conjunction with an appropriate electronic device to view images associated with VR applications and/or VR content that are displayed on the electronic device. As described herein, the input mechanism 150 can also be used to interact with such VR applications and/or VR content.

Figure 10:
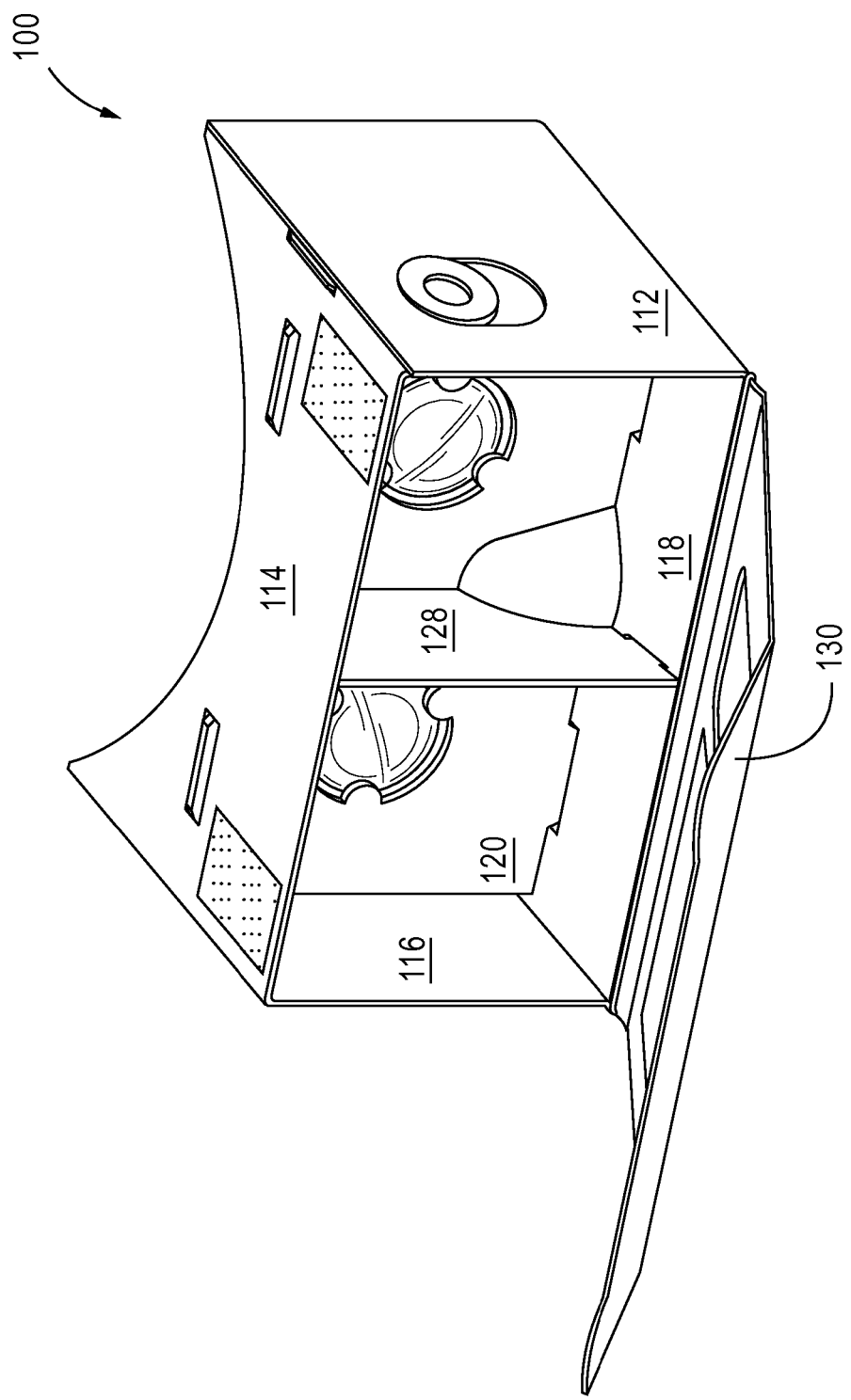
FIG. 10 is a perspective view of the VR headset of FIGS. 1A and 1B prior to insertion of an electronic device, according to an implementation.
Figure 11:
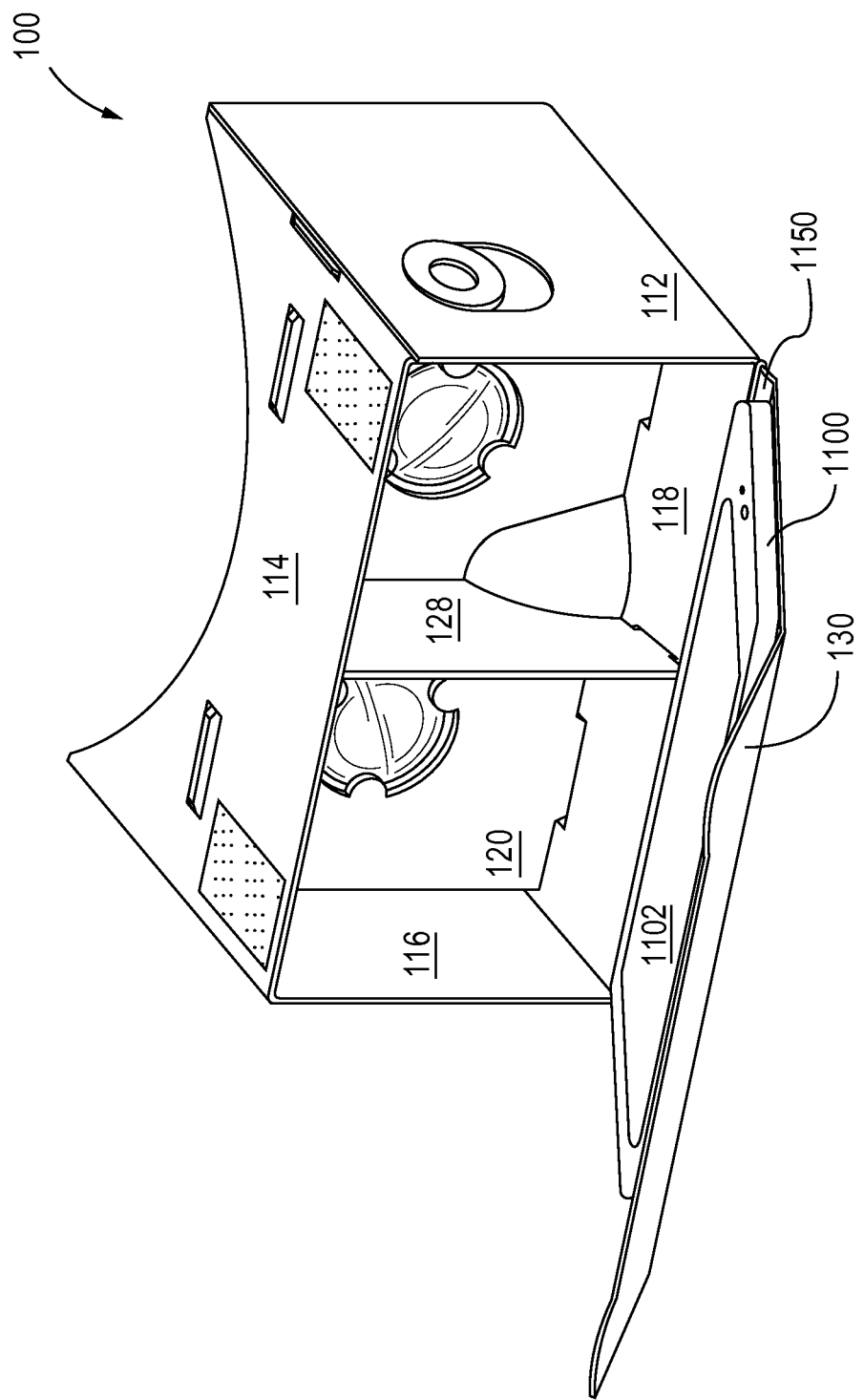
FIG. 11 is a perspective view of the VR headset of FIG. 10 after insertion of an electronic device, according to an implementation.
Figure 12:
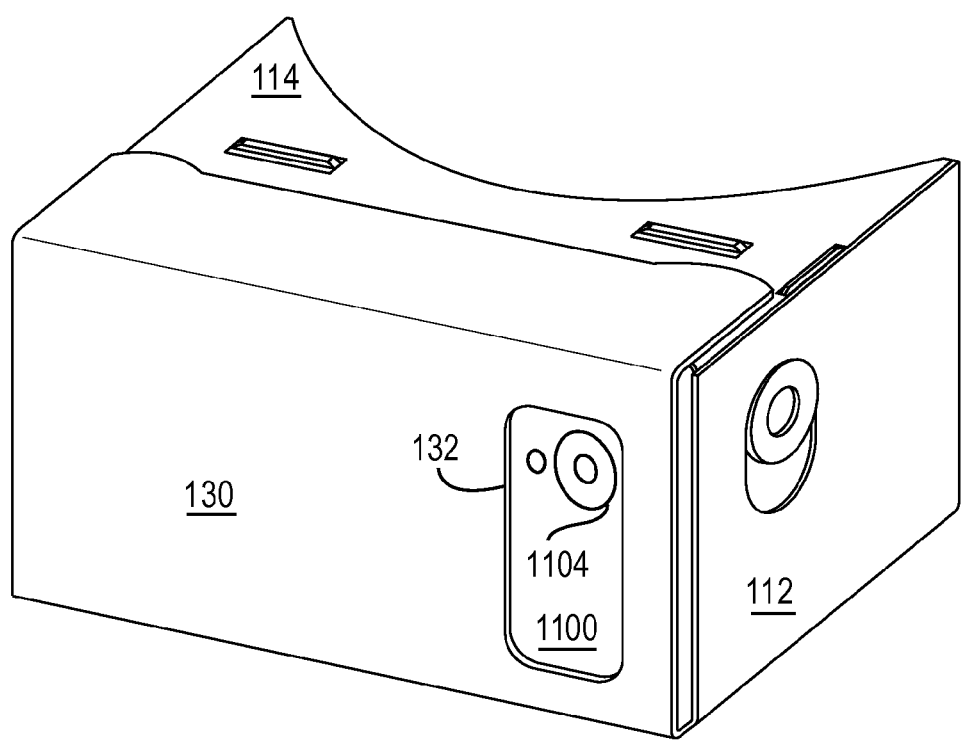
FIG. 12 is a perspective view of the VR headset of FIGS. 10 and 11 with the electronic device secured in the VR headset, according to an implementation.

FIG. 10 is a perspective view of the VR headset 100 of FIGS. 1A and 1B after completion of the folding process illustrated in, and described above with respect to FIGS. 5-9, and prior to insertion of an electronic device, according to an implementation. As shown in FIG. 11, an electronic device 1100 can be inserted in the VR headset 100, such that a display panel 1102 of the electronic device 1100 is facing the center tab 128 and the lens frame assembly 120 of the VR headset 100. As shown in FIG. 12, after insertion of the electronic device 1100 in the VR headset 100, the enclosure flap 130 may folded up, along its hinge with the side 118, and attached (e.g., using the hook and loop fasteners) with the side 114 of the VR headset 100 to secure the electronic device 1100 in the VR headset 100 (e.g., with the display panel 1102 being in contact with the center tab 128). As shown in FIG. 11, the VR headset 100 may further include a non-skid insert 1150 that is configured to prevent movement of the electronic device 1100 when it is enclosed (secured) in the VR headset 100. The non-skid insert 1150 may include a rubber strip, a rubber band, or the like.

As shown in FIG. 12, a camera 1104 of the electronic device 1100 may be visible through the window 132 in the enclosure flap 130. Such an arrangement may allow the camera 1104 to be used in conjunction with VR applications and/or content that is being executed and/or displayed by the electronic device 1100. For example, the camera 1104 may be used to capture images of a user's surroundings that can be used as part of the VR content, interact with the visual (3D) token 254, and so forth.

Figure 13:
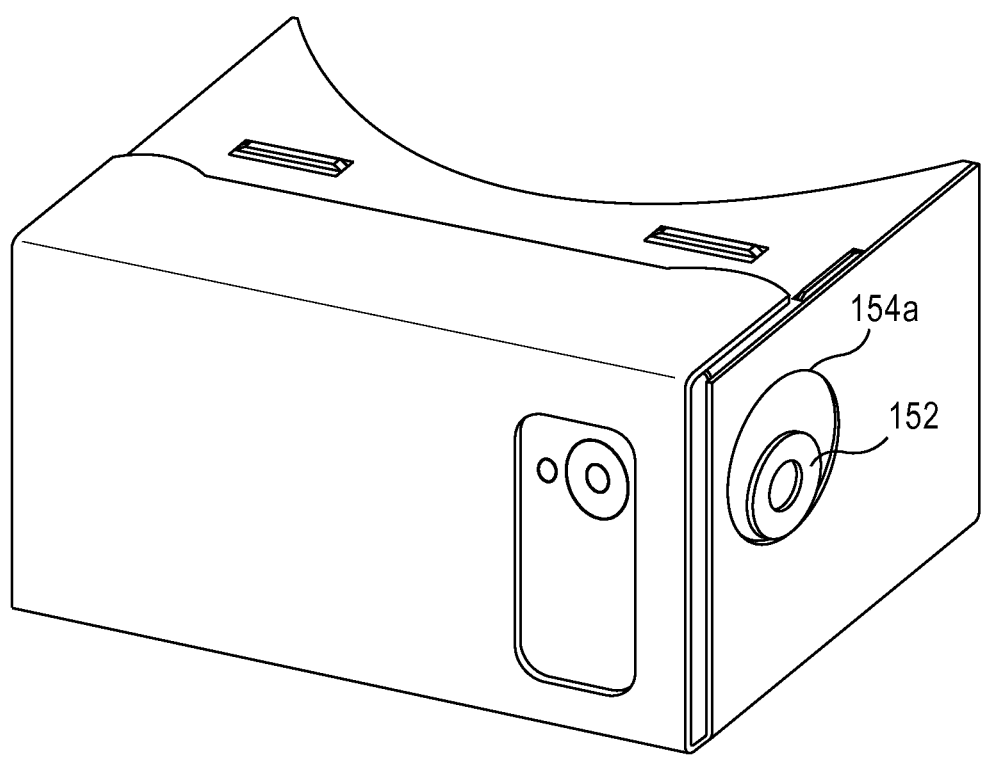
FIG. 13 is a perspective of a VR headset including an alternative input device than the input device included in, for example, the VR headset of FIG. 1A, according to an implementation.

FIG. 13 is a perspective of a VR headset including an alternative input device than the input device included in, for example, the VR headset of FIG. 1A, according to an implementation. The input device in FIG. 13, as with the input device discussed above with respect to FIG. 1A, includes a first magnet 152 that is disposed within a round opening 154a (which can be referred to as a round slot 154a or a slot 154a) on the side of the chassis of the VR headset. As with the input device 150, the input device of FIG. 13 can also include a second magnet 158 (not shown in FIG. 13) that is disposed (fixedly disposed) on an opposing surface of the side of the chassis from the magnet 152. In this implementation, the magnet 152 can be slid (e.g., by an external force, such as user's finger) around within the round opening 154a, causing the magnetic field produced by the two magnets of the input device to change. An electronic device that is inserted in the VR headset 100 may detect this change in the magnetic field as an input signal that allows a user to interact with a VR application or VR content that is being executed on the electronic device. For instance, the input device in FIG. 13 could, in conjunction with a VR application or VR content, operate in similar fashion as a joystick input device, such as those that can be used with video game systems or personal computer implemented games, for example.

In a general aspect, a virtual reality (VR) headset can include a goggle portion and an enclosure flap. The goggle portion can include a chassis having a left side, a right side, a top side and a bottom side. The chassis can be open at a first end and open at a second end. The first end can be configured for placement near or against a face of a user. The second end can be configured to receive an electronic device including a display panel. The goggle portion can also include a lens frame assembly that is disposed within the chassis and disposed between the first end and the second end. The enclosure flap can be hingably coupled with the goggle portion at a first end of the enclosure flap. A second end of the enclosure flap can be removably attachable to the chassis to secure the electronic device in the VR headset. The goggle portion and the enclosure flap can be a unitary structure formed from a single precision-cut sheet.

Implementations can include one or more of the following features. For instance, the headset can include a fastening device disposed on at least one of the enclosure flap and the top surface of the chassis. The fastening device can be configured to removably attach the second end of the enclosure flap to the chassis.

The headset can include a pair of aspherical lenses disposed in the lens frame assembly, such that images displayed on a display panel of the electronic device are viewable from the first end of the chassis through the pair of aspherical lenses. The lens frame can include a three-layer stack having a first outer layer, an inner layer and a second outer layer. An aspherical lens of the pair of aspherical lenses can be disposed within a lens opening defined in the inner layer. The aspherical lens of the pair of aspherical lenses can be held in place by respective pluralities of retention tabs disposed around respective perimeters of respective lens openings defined in the first outer layer and the second outer layer.

The headset can include an input mechanism disposed on the chassis. The input mechanism can be configured to interact with the electronic device. The input device can include a magnetic input device. The input device can be disposed on one of the left side of the chassis and the right side of the chassis. The input device can include a first magnet disposed on an interior surface of the right side of the chassis and a second magnet disposed within a slot defined in an exterior surface of the right side of the chassis. The second magnet can be slidable, in response to an external force, from a first position within the slot to a second position within the slot. The magnetic forces of the first magnet and the second magnet can cause the second magnet to return from the second position to the first position upon removal of the external force.

The single precision-cut sheet can be folded to form the VR headset. The single precision-cut sheet can be one of a die-cut cardboard sheet and a laser-cut cardboard sheet.

The headset can include a near field communication (NFC) tag disposed on the enclosure flap. The NFC communication tag can be configured to identify the VR headset to the electronic device.

The goggle portion can include a center flap disposed between the lens frame assembly and the second end. The center flap can be configured, in conjunction with the enclosure flap, to secure the electronic device in the VR headset. The headset can include a plurality of complementary tabs and slots formed in the single precision-cut sheet. The plurality of complementary tabs and slots can be configured to align the center flap with the chassis the lens frame assembly.

The headset can include a plurality of complementary tabs and slots formed in the single precision-cut sheet, the plurality of complementary tabs and slots can be configured to align the lens frame assembly in the chassis. The plurality of complementary tabs and slots can be configured to align a first layer of the right side of the chassis with at least a second layer of the right side of the chassis.

The headset can include assembly instructions for the VR headset printed on the single precision-cut sheet. The headset can include a visual token printed on the single precision-cut sheet. The visual token can be configured to interact with VR content executed by the electronic device in response to recognition of the visual token using a camera of the electronic device. The headset can include a non-skid insert disposed on at least an interior surface of the bottom side of the chassis adjacent the first end of the enclosure flap. The non-skid insert can be configured to prevent movement of the electronic device in the VR headset.

In another general aspect, an article of manufacture can include a single die-cut cardboard sheet configured to be folded to form a virtual reality (VR) headset. The single die-cut cardboard sheet can include a lens frame portion having a first lens frame layer, a second lens frame layer and a third lens frame layer configured to be folded to form a three-layer stack configured to secure a pair of aspherical lenses of the VR headset. The single die-cut cardboard sheet can also include chassis having a plurality of sections that are configured to be folded to form the chassis such that the chassis is disposed around the lens frame portion. The chassis can be further configured to secure the lens frame portion in a fixed position within the chassis. The single die-cut cardboard sheet can further include an enclosure flap that is hingably coupled with a first section of the plurality of sections of the chassis. The enclosure flap can be configured to be removably attached with a second section of the plurality of sections of the chassis to secure an electronic device in the VR headset.

Implementations can include one or more of the following features. For instance, the article of manufacture can include at least a first adhesive strip for fixing the first lens frame, the second lens frame layer and the third lens frame layer in their folded positions. The article of manufacture can include at least a second adhesive strip for fixing the plurality of sections of the chassis in their folded positions.

A number of implementations have been described. Nevertheless, it will be understood that various modifications may be made without departing from the spirit and scope of the invention.

What is claimed is:
1. A virtual reality (VR) headset comprising:
   a goggle portion including:
      a chassis having a left side, a right side, a top side and a bottom side, the chassis being open at a first end and open at a second end, the first end being configured for placement near or against a face of a user and the second end being configured to receive an electronic device including a display panel; and
      a lens frame assembly, the lens frame assembly being disposed within the chassis and disposed between the first end and the second end; and
   an enclosure flap hingably coupled with the goggle portion at a first end of the enclosure flap, a second end of the enclosure flap being removably attachable to the chassis to secure the electronic device in the VR headset, the goggle portion and the enclosure flap being a unitary structure formed from a single precision-cut sheet.

2. The VR headset of claim 1, further comprising a fastening device disposed on at least one of the enclosure flap and the top side of the chassis, the fastening device configured to removably attach the second end of the enclosure flap to the chassis.

3. The VR headset of claim 1, further comprising a pair of aspherical lenses disposed in the lens frame assembly such that images displayed on a display panel of the electronic device are viewable from the first end of the chassis through the pair of aspherical lenses.

4. The VR headset of claim 3, wherein the lens frame includes a three-layer stack having a first outer layer, an inner layer and a second outer layer, an aspherical lens of the pair of aspherical lenses being disposed within a lens opening defined in the inner layer and being held in place by respective pluralities of retention tabs disposed around respective perimeters of respective lens openings defined in the first outer layer and the second outer layer.

5. The VR headset of claim 1, further comprising an input mechanism disposed on the chassis, the input mechanism being configured to interact with the electronic device.

6. The VR headset of claim 5, wherein the input mechanism includes a magnetic input device.

7. The VR headset of claim 5, wherein the input mechanism is disposed on one of the left side of the chassis and the right side of the chassis.

8. The VR headset of claim 7, wherein the input mechanism includes:
a first magnet disposed on an interior surface of the right side of the chassis; and
a second magnet disposed within a slot defined in an exterior surface of the right side of the chassis, the second magnet being slidable, in response to an external force, from a first position within the slot to a second position within the slot, the magnetic forces of the first magnet and the second magnet causing the second magnet to return from the second position to the first position upon removal of the external force.

9. The VR headset of claim 1, wherein the single precision-cut sheet is folded to form the VR headset.

10. The VR headset of claim 1, wherein the single precision-cut sheet is one of a die-cut cardboard sheet and a laser-cut cardboard sheet.

11. The VR headset of claim 1, further comprising a near field communication (NFC) tag disposed on the enclosure flap, the NFC tag being configured to identify the VR headset to the electronic device.

12. The VR headset of claim 1, wherein the goggle portion further includes a center flap disposed between the lens frame assembly and the second end, the center flap being configured, in conjunction with the enclosure flap, to secure the electronic device in the VR headset.

13. The VR headset of claim 12, further comprising a plurality of complementary tabs and slots formed in the single precision-cut sheet, the plurality of complementary tabs and slots being configured to align the center flap with the chassis the lens frame assembly.

14. The VR headset of claim 1, further comprising a plurality of complementary tabs and slots formed in the single precision-cut sheet, the plurality of complementary tabs and slots being configured to align the lens frame assembly in the chassis.

15. The VR headset of claim 14, wherein the plurality of complementary tabs and slots are further configured to align a first layer of the right side of the chassis with at least a second layer of the right side of the chassis.

16. The VR headset of claim 1, further comprising assembly instructions for the VR headset printed on the single precision-cut sheet.

17. The VR headset of claim 1, further comprising a visual token printed on the single precision-cut sheet, the visual token configured to interact with VR content executed by the electronic device in response to recognition of the visual token using a camera of the electronic device.

18. The VR headset of claim 1, further comprising a non-skid insert disposed on at least an interior surface of the bottom side of the chassis adjacent the first end of the enclosure flap, the non-skid insert being configured to prevent movement of the electronic device in the VR headset.

19. An article of manufacture comprising:
a single die-cut cardboard sheet configured to be folded to form a virtual reality (VR) headset, the single die-cut cardboard sheet including:
a lens frame portion having a first lens frame layer, a second lens frame layer and a third lens frame layer configured to be folded to form a three-layer stack configured to secure a pair of aspherical lenses of the VR headset;
a chassis having a plurality of sections that are configured to be folded to form the chassis such that the chassis is disposed around the lens frame portion, the chassis being further configured to secure the lens frame portion in a fixed position within the chassis; and
an enclosure flap that is hingably coupled with a first section of the plurality of sections of the chassis, the enclosure flap being configured to be removably attached with a second section of the plurality of sections of the chassis to secure an electronic device in the VR headset.

20. The article of manufacture of claim 19, further comprising:
at least a first adhesive strip for fixing the first lens frame, the second lens frame layer and the third lens frame layer in their folded positions; and
at least a second adhesive strip for fixing the plurality of sections of the chassis in their folded positions.

* * * * *